United States Patent [19]
Fauble et al.

[11] Patent Number: 5,641,445
[45] Date of Patent: Jun. 24, 1997

[54] APPARATUS AND METHOD FOR EXTRUDING MULTI-LAYERED FUEL TUBING

[75] Inventors: Michael K. Fauble, Cadillac; William Troy Browder, Marion; Glenn V. Dukes, Cadillac, all of Mich.

[73] Assignee: Cadillac Rubber & Plastics, Inc., Cadillac, Mich.

[21] Appl. No.: 507,056

[22] Filed: Jul. 25, 1995

[51] Int. Cl.⁶ .......................... B29C 47/06; B29C 47/20
[52] U.S. Cl. .................. 264/171.24; 156/244.14; 264/171.26; 264/171.27; 425/133.1; 425/379.1; 425/462
[58] Field of Search .................. 264/171.26–27, 264/171.24, 171.12, 40.6; 425/133.1, 131.1, 462, 467, 379.1; 156/244.14, 244.13

[56] References Cited

U.S. PATENT DOCUMENTS

| | | | |
|---|---|---|---|
| 4,095,736 | 6/1978 | Kitami et al. | |
| 4,118,167 | 10/1978 | Lund et al. | |
| 4,362,488 | 12/1982 | Casals et al. | 425/133.1 |
| 4,422,991 | 12/1983 | Phillips | |
| 4,773,954 | 9/1988 | Starnes, Jr. | 425/133.1 |
| 4,859,380 | 8/1989 | Ogata | |
| 4,887,647 | 12/1989 | Igarashi et al. | 138/137 |
| 5,192,476 | 3/1993 | Green | 264/171.12 |
| 5,320,888 | 6/1994 | Stevens | |
| 5,356,681 | 10/1994 | Ichikawa et al. | 138/137 |
| 5,460,771 | 10/1995 | Mitchell et al. | 264/508 |
| 5,500,257 | 3/1996 | Krause et al. | 427/487 |
| 5,512,225 | 4/1996 | Fukushi | 264/172.1 |
| 5,525,288 | 6/1996 | Ninomiya et al. | 264/506 |

FOREIGN PATENT DOCUMENTS

| | | | |
|---|---|---|---|
| 0551094A1 | 7/1993 | European Pat. Off. | |
| 0616160A1 | 9/1994 | European Pat. Off. | |
| 55-15293 | 4/1980 | Japan | 264/171.27 |
| 58-162336 | 9/1983 | Japan | 264/171.27 |
| 59-29141 | 2/1984 | Japan | 425/133.1 |
| 63-246224 | 10/1988 | Japan | 425/462 |

Primary Examiner—Jeffery R. Thurlow
Attorney, Agent, or Firm—Varnum, Riddering, Schmidt & Howlett LLP

[57] ABSTRACT

An extrusion die for extruding at least two layers of polymers at substantially different temperatures wherein a first die has portions connected to a second die and portions spaced from the second die. Insulation is provided between the first and second dies and the first die is water cooled. A layer of insulation is provided between the spaced portion of the first and second dies. A third die is mounted to the second die and co-extrudes a third material onto the laminate formed by the first and second dies. The third die is connected to the second die but has portions spaced from the second die. The spaced portion between the second and third dies are insulated. A thermosetting polymer, such as FKM, is extruded by the first die at a temperature of about 180°–200° F. A fluorinated, thermoplastic polymer, such as THV, is extruded from the second die at a temperature of about 480° F. A thermosetting polymer, such as ECO, used to extrude multilayered fuel tubing.

26 Claims, 3 Drawing Sheets

APPARATUS AND METHOD FOR EXTRUDING MULTI-LAYERED FUEL TUBING

BACKGROUND OF THE INVENTION

1. Field of the Invention

This invention relates to a method and an apparatus for co-extruding a multi-layered flexible tube. More specifically, this invention relates to a method and an apparatus for co-extruding a flexible tube having at least a rubber inner layer and a plastic outer layer for use in transporting fuels and other hazardous fluids.

2. Description of Related Art

In order to meet U.S. EPA standards for automotive vehicle emissions, any conduit serving as a fuel transporting hose must be sufficiently impermeable to hydrocarbon vapors emitted by various fuels. A typical fuel-carrying hose comprises one or more layers of rubber or plastic materials or a combination thereof. One such composite fuel and vapor barrier tube is disclosed in PCT Application Ser. No. PCT/US94/07375, filed Jun. 30, 1994, Internaitonal Publication No. WO96/00657, Published 11 Jan. 1996, and is incorporated herein by reference. The application discloses a composite tube comprised of an inner layer of a rubbery material such as FKM, a terpolymer of tetrafluoroethylene (TFE), hexafluoropropylene (HFE) and vinylidine chloride ($VF_2$) and at least one outer layer of a plastic material such as THV, also a terpolymer of TFE, HFE and $VF_2$. Multi-layer tubular structures such as this are generally co-extruded in a continuous process to provide a resilient and tubular article.

Several prior art references disclose extrusion processes which produce a multi-layer tubular article which may or may not have an intervening reinforcing layer.

U.S. Pat. No. 4,422,911 to Phillips, issued Dec. 27, 1983, discloses a method of making an extruded plastic tube having inner and outer portions. The reference discloses that a heater is typically provided concentrically around the main body of the extruder to control the temperature of the extruded plastic material during the extrusion process.

The European Patent Application Publication No. 0 551 094 discloses a method of making a fluoropolymer composite tube by co-extruding a conductive fluoropolymer with a non-conductive fluoropolymer, treating the outer layer of the non-conductive fluoropolymer with a corona discharge and crosshead extruding a plastic polyamide layer onto the non-conductive, treated fluoropolymer layer.

U.S. Pat. No. 4,362,488 to Casals et al., issued Dec. 7, 1982, discloses an extruder for the continuous manufacture of reinforced tubing including a tubular spacer member which cooperates with both an inner tubular member and an intermediate tubular member to define an annular passage through which the material to be extruded passes during the extrusion process. The inner and intermediate tubular members include interior passages for circulation of a temperature-regulating fluid therethrough such that the extruder head is maintained at a proper temperature throughout the extrusion operation.

One problem not solved by the prior art is the difficulty in co-extruding a rubbery material with a plastic material due to the different extrusion temperature requirements of each during the process. A rubber material such as FKM is generally extruded at a temperature of perhaps 185°–220° F. whereas a plastic material such as THV must be extruded at a much higher temperature of about 480° F. If the rubber layer is subjected to temperatures of 480° F., the rubber layer will be scorched and, thus, the end product will have undesirable properties.

SUMMARY OF INVENTION

According to the invention, an extrusion die for co-extruding at least two layers of polymers at substantially different temperatures comprises a first die having an extrusion nozzle defining an opening for extruding a first molten material into a predetermined shape along an axis through the first die opening and a first housing having a passage for delivering under pressure the first molten material at a first temperature to the first die. A second die has an opening for extruding a second molten material at a second temperature different than the temperature of the first molten material onto the predetermined shape to laminate the second material onto the predetermined shape. Fasteners join the second die to the first die in juxtaposition thereto and with the axes of the first and second die openings coaxial. A second housing is mounted to the second die and has a passage for delivering under pressure a second molten material to the second die opening. A layer of insulation is provided between the first die and the second die to minimize heat transfer therebetween.

The first die extrusion nozzle preferably has a short annular land at a downstream end portion thereof and the second housing is positioned at least in part between the first die and the second die and has an edge in supporting contact with the annular land. The second housing is typically annular and supports the annular land about substantially the entire periphery thereof.

In a preferred embodiment of the invention, the first die has a conical exterior surface upstream of the annular land the layer of insulation extends along the conical exterior surface of the first die.

The layer of insulation can be formed of any suitable insulating material. Preferably, those materials having the thermal transfer properties of glass fiber batting or better are used in the layer of insulation.

Preferably, the first die extrusion nozzle has a leading edge which forms a second extrusion nozzle with a portion of the second die. The second die has a conduit in communication between the passage in the second housing and the second extrusion nozzle. The second die conduit preferably extends substantially orthogonally from the axes of the first and second die openings. In a preferred embodiment of the invention, the second die conduit spirals about the axes of the first and second die opening.

In a preferred embodiment of the invention, the first die has an internal chamber connected to external ports for circulation of cooling liquid for cooling the first die.

In one embodiment of the invention, a third die is mounted to the second die and is adapted to deposit a molten layer of a third material onto the layer of second material to form a laminate therewith. The third die preferably has an inner annular portion forming an opening for the laminate of the first and second materials to pass therethrough and the inner annular portion has an upstream portion in contact with the downstream end of the second die. An outer annular portion of the third die has an upstream surface which is axially spaced from the downstream end of the second die and a layer of insulation is provided between the upstream surface of the outer annular portion of the third die and the downstream end of the second die to minimize heat transfer between the two.

The invention is advantageously used in making multi-layer tubing. To this end, a mandrel extends through the openings in the first and second dies. In the second embodiment of the invention, the mandrel extends through the opening in the third die as well.

Further according to the invention, there is a process for co-extruding at least two layers of polymers at substantially different temperatures in a first die having an extrusion nozzle defining an opening for extruding a first thermosetting polymer into a predetermined shape along an axis through a first die opening and a second die having an opening for extruding a thermoplastic polymer onto the predetermined shape to produce a laminate of two polymers. The method comprises the steps of extruding a first thermosetting polymer through the first die opening at a first temperature to form a predetermined shape, extruding a thermoplastic polymer through the second die opening at a second temperature substantially higher than the first temperature and onto the predetermined shape to form a laminate of the two polymers. The process further comprises the step of insulating the first die from the second die to maintain the temperature of the first thermosetting polymer and the thermoplastic polymer at the first and second predetermined temperatures, respectively, at least until the first thermosetting polymer and the thermoplastic polymer are extruded from the first and second die openings, respectively.

Preferably, the temperature of the thermosetting material is maintained beneath 220° F. and the second temperature is maintained above about 450° F.

In a second embodiment of the invention, a second thermosetting polymer is extruded through a third die opening to deposit a layer of the second thermosetting material onto the layer of the thermoplastic material to form a laminate therewith. At least portions of the third die are spaced axially from the second die and the axial space between the second die and the third die is insulated to maintain the temperature of the thermoplastic polymer and the second thermosetting polymer at their respective extrusion temperatures. The second thermosetting polymer preferably has an extrusion temperature of less than 220° F. and can be any suitable rubber polymer such as ECO.

The extrusion temperatures of the first and second thermosetting polymers can vary over a wide range. However, the temperatures generally will be in the range of 180° to 220° F.

The temperature of the thermoplastic polymer can also vary over a relatively wide range. Preferably, the thermoplastic polymer is a fluorinated polymer with a relatively high melting point, for example, about 480° F.

In a preferred embodiment of the invention, the extrusion die includes a mandrel so that the predetermined shape is a tubular shape. The mandrel preferably extends through the first and second die openings in the first embodiment and, in addition, through the third die opening in the second embodiment.

BRIEF DESCRIPTION OF THE DRAWINGS

The invention will now be described with reference to the drawings wherein:

FIG. 3 is a fragmentary longitudinal cross-sectional view of a dual-layer fuel tube produced by the extrusion apparatus of FIG. 1 according to the invention;

DESCRIPTION OF THE PREFERRED EMBODIMENTS

Figure 1:
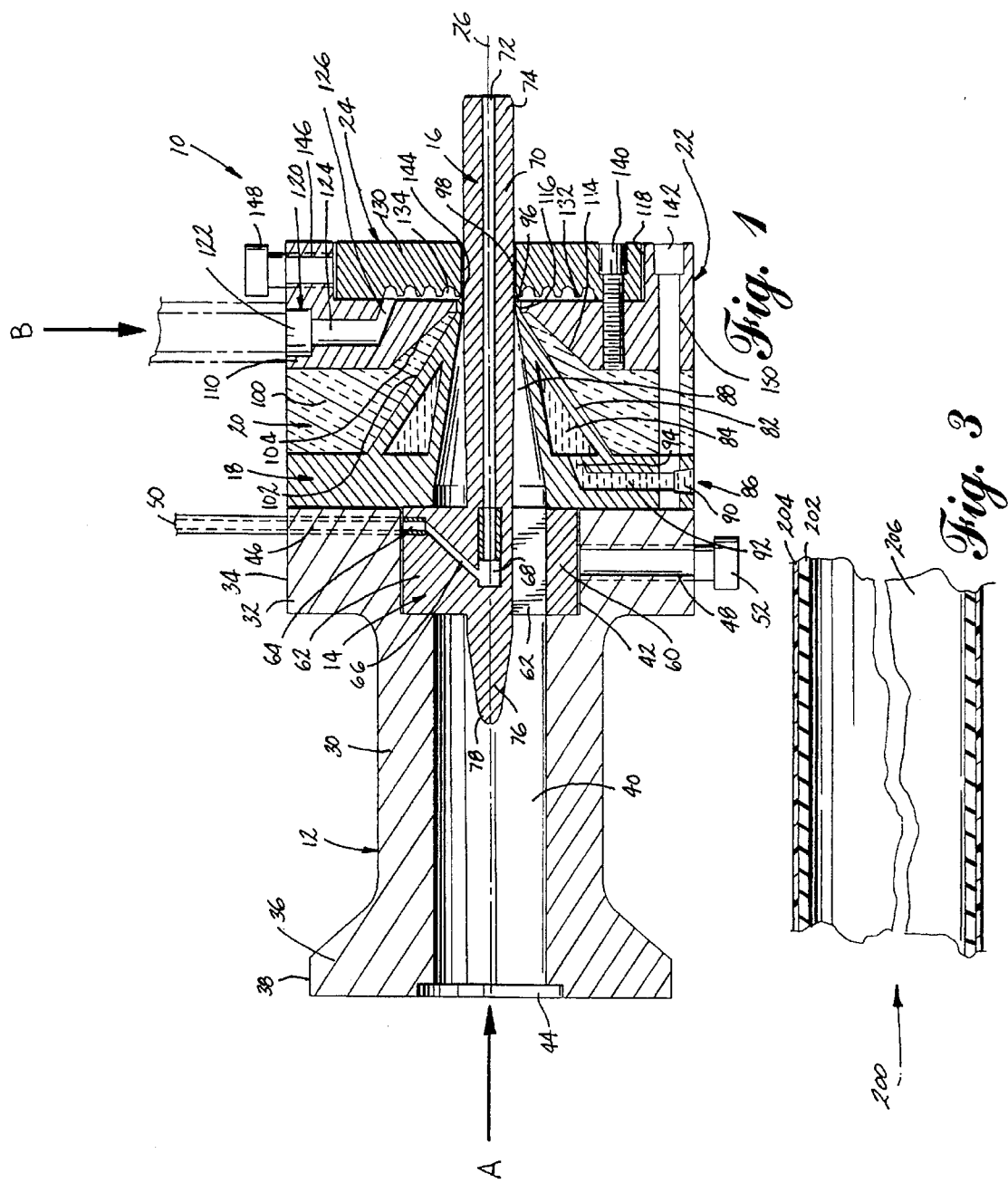
FIG. 1 is a longitudinal cross-sectional view of a dual-layer extrusion apparatus according to the invention.

Turning to the drawings and in particular to FIG. 1, an extrusion head shown generally at 10 comprises a feeder housing 12, a support 14 for mandrel 16, first die 18, insulator ring 20, feeder plate 22, and second die 24, all of which are concentrically arranged about longitudinal axis 26 of mandrel 16.

Housing 12 comprises a cylindrical portion 30 having a radial flange 32 at a proximal end 34 of cylindrical portion 30 and an angularly extending flange 36 at a distal end 38 of cylindrical portion 30. A bore 40 is disposed along longitudinal axis 26 and has countersunk bores 42, 44 at the proximal and distal ends 34, 38, respectively, of housing 12. Housing 12 includes transverse bore 46 which passes through radial flange 32. A plurality of adjustment bores 48 (only one of which is shown in FIG. 1) are spaced equally around the circumference of housing 12.

Support 14 comprises an annular ring 60 connected to mandrel 16 by a plurality of spokes 62, an inlet port 64 in alignment with first transverse bore 46 in housing 12, and a conduit 66 extending inwardly down one of the spokes 62 and connecting the inlet port 64 with a chamber 68 in the central portion of mandrel 16. Mandrel 16 further comprises a longitudinal cylindrical portion 70 having a longitudinal central bore 72 connecting chamber 68 with the atmosphere at distal end 74 of mandrel 16. The proximal end 76 of mandrel 16 tapers into a rounded conical section 78.

First die 18 comprises an annular base 80, an axially extending truncated cone portion 82 having an interior annular chamber 84, a transverse inlet conduit 86, and a tapering longitudinal central bore 88. Conduit 86 comprises an inlet port 90 disposed along the exterior surface of annular base 80, a transverse channel 92, and an angled channel 94 connecting the transverse channel 92 with the interior chamber 84. The axial tip of the truncated cone portion 82 tapers axially to form extrusion nozzle 96. An outlet conduit (not shown) is identical to conduit 86 but is circumferentially spaced from the inlet conduit 18 and is likewise connected to the interior chamber 84. An annular land 97 forms an outer surface of the extrusion nozzle 96.

Insulator ring 20 comprises a radially extending body 100 defining interior and exterior converging conical surfaces 102 and 104, respectively. The insulator ring 20 is constructed of a ceramic/glass fiber insulating material in order to provide efficient insulation between the first die 18 and the feeder plate 22. Any suitable insulating material can be used in insulator ring 20. Typically, the insulation has the thermal insulating properties of glass fiber batting or better.

Feeder plate 22 is a housing which comprises an annular element 110 having a concentric bore 112 including three portions: a tapered bore portion 114, a narrow bore 116, and a wide countersunk bore 118. Feeder plate 22 also includes a feeder conduit 120 comprising a transverse inlet port 122 disposed along the exterior surface of annular element 110, an inwardly extending channel 124, and an angularly extending channel 126. Feeder plate 22 has an annular edge 128 which is in contact with the annular land 97 of the die 18.

Second die 24 comprises an annular disk 130 having an interior surface 132 on which is defined a spiral groove 134 which spirals outwardly from the center of the disk 130 and in a direction orthogonal to the central axis of the mandrel 16. The second die 24 includes a central bore 136 just slightly larger than the diameter of mandrel 16. The second die 24 also includes transverse bore 146 and axial bore 150 passing through annular element 110.

In assembly, the annular ring 60 of support 14 is slidably installed within the proximal countersunk bore 42 of housing 12 such that the rounded conical section 78 of mandrel 16 extends into the longitudinal bore 40 of housing 12. A plurality of adjustment screws 52 are disposed in adjustment bores 48. The screws 52 can be tightened or loosened individually to concentrically locate and adjust the annular ring 60 supporting mandrel 16. The distal countersunk bore 44 is interfaced with a first extruder (not shown) which supplies a heated fluid thermosetting elastomer such as an FKM rubber along the direction A. The transverse bore 46 of housing 12 is aligned with a compressed air supply conduit shown generally at 50 and is further aligned with the inlet port 64 on support 14 such that the compressed air supply conduit 50 supplies air to chamber 68 via inlet port 64 and conduit 66. Annular base 80 of first die 18 is in an abutting relationship with the radial flange 32 of housing 12 such that the interior surface of truncated cone portion 82 and the exterior surface of longitudinal portion 70 of mandrel 16 defines the generally tapering annular conduit 88. Extrusion nozzle 96 defines a first annular gap 98 between the nozzle 96 and the exterior surface of longitudinal portion 70 of mandrel 16. The radially-extending flange 100 of insulator ring 20 abuts the annular base 80 of first die 18 such that the interior conical surface 102 of insulator ring 20 borders the exterior surface of truncated cone portion 82 of first die 18. The annular element 110 of feeder plate 22 is adjacent to the radially-extending flange 100 of insulator ring 20 such that the exterior conical surface 104 of insulator ring 20 abuts the tapered bore 114 of feeder plate 22 and such that the only contact point between the feeder plate 22 and first die 18 is the point where extrusion nozzle 96 on first die 18 meets the narrow bore 116 on feeder plate 22. Second die 24 is disposed within the wide countersunk bore 118 of feeder plate 22 such that the outermost channel of spiral groove 134 is in alignment with the angularly-extending channel 126 of feeder conduit 120. Feeder conduit 120 is connected to a second extruder (not shown) which supplies a heated molten thermoplastic polymer such as the THV in the direction B. A second annular gap 138 is defined by the central bore 136 of second die 24 and the exterior surface of longitudinal portion 70 of mandrel 16. An annular distribution channel 144 is formed by the inner edge of the die 24 and the leading edge of annular land 97, and joins the innermost spiral groove 134 with the second annular gap 138. Threaded fastener 140 holds the second die 24 to the feeder plate 22 with sufficient clearance to allow for the centering adjustment of second die 24 which can be carried out by a plurality of adjustment screws 148 disposed around the circumference of feeder plate 22 through transverse bores 146. Threaded fastener 142 extends into axial bore 150 and holds the second die 24, feeder plate 22, insulator ring 20 and first die 18 in a tight, adjusted relationship.

Figure 2:
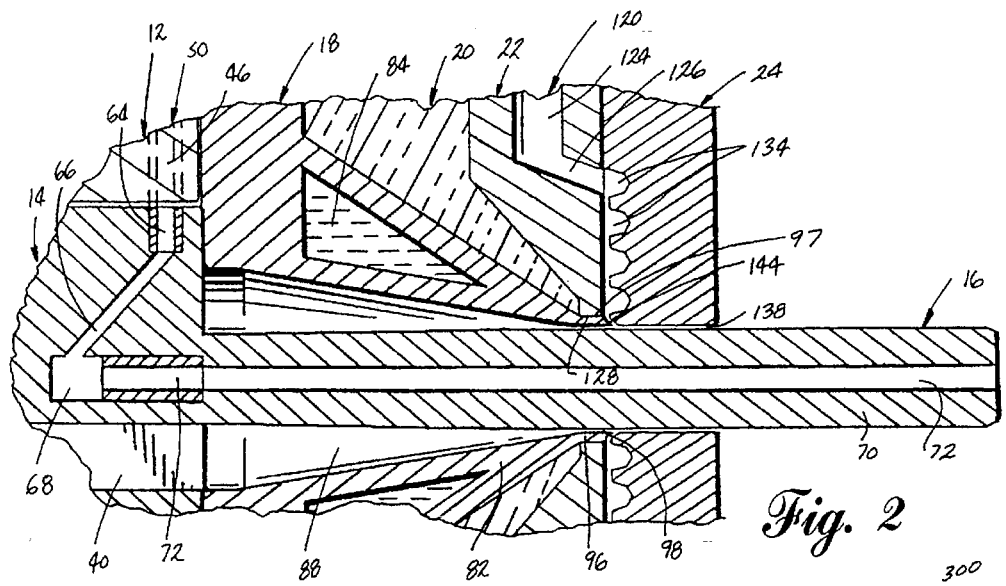
FIG. 2 is an enlarged portion of FIG. 1, showing the flow path of the extruded material in greater detail.

In operation, a first extruder such as a screw-type feeder or a plunger (not shown) interfaced with countersunk bore 44 of housing 12 will force a molten rubbery material, for example, FKM, into longitudinal bore 40 along direction A. FKM rubber must be extruded at a temperature of approximately 185°–220 ° F. A concentric heating means (not shown) can be provided around the housing 12 to maintain the interior bore 40 at this elevated temperature. As the molten rubbery material passes through longitudinal bore 40 in housing 12, the first material is forced to flow around the rounded conical section 78 of mandrel 16. As the first material enters the generally tapering gap 88 in first die 18, the pressure of the first material increases as it is forced towards extrusion nozzle 96. To maintain the first die 18 at a constant temperature, water or any other suitable cooling fluid is introduced through conduit 86 into interior chamber 84 of truncated cone portion 82 of first die 18. The water is circulated through the interior chamber 84 and removed through an outlet conduit (not shown). The flow path of the extruded rubber layer is more clearly visible in FIG. 2. As the rubbery material passes through extrusion nozzle 96, it forms the inner layer 202 of the fuel tubing 200 (see FIG. 3). The thermoplastic material is introduced into inlet port 122 from a second extruder (not shown) along the direction noted at "B." The thermoplastic material can be any desirable extrudable material, which, in this case, is a thermoplastic such as THV. The thermoplastic material is urged along feeder conduit 120 and enters the spiral groove 134 in second die 24 via angular channel 126. The thermoplastic material travels inwardly along the spiral groove 134. The second die 24 is maintained at a temperature of about 480° F., well above the temperature of the rubber compound which is extruded through the annular gap 98. The thermoplastic material travels inwardly along spiral groove 134 until it encounters annular distribution channel 144 wherein the second material then exits the second die 24 and is forced into the second annular gap 138 on top of the inner tube layer 202 formed by the first die 18. The deposited second material forms an outer annular layer 204 on top of the inner layer 202 (see FIG. 3) and is held onto the first layer by the extreme pressures present in the extrusion channel. As the hose exits the extrusion head 10, compressed air is continually introduced into the first transverse bore 46 which, in turn, directs the compressed air into central bore 72 of mandrel 16 via chamber 68, conduit 66 and inlet port 64. The compressed air in central bore 72 exits the distal end 74 of mandrel 16 and is introduced into the longitudinal enclosure 206 (see FIG. 3) of the newly-formed tube 200 as that particular portion of the tube passes the distal end 74 of mandrel 16 and prevents the newly-formed hose from collapsing. The combination of the insulator ring 20 and the fluid cooling of the die 18 maintains the rubbery polymer in the first die 18 at a relatively low temperature and the plastic polymer in the second die 24 at a relatively higher temperature for co-extrusion of both polymers at temperatures which are appropriate to each.

After the composite two-layer tube 200 exits the die, it can be passed through a crosshead extruder (not shown) wherein an outer layer of an elastomer is deposited. The three-layer composite can then be shaped and vulcanized as described in PCT application Ser. No. PCT/US94/07375.

Figure 5:
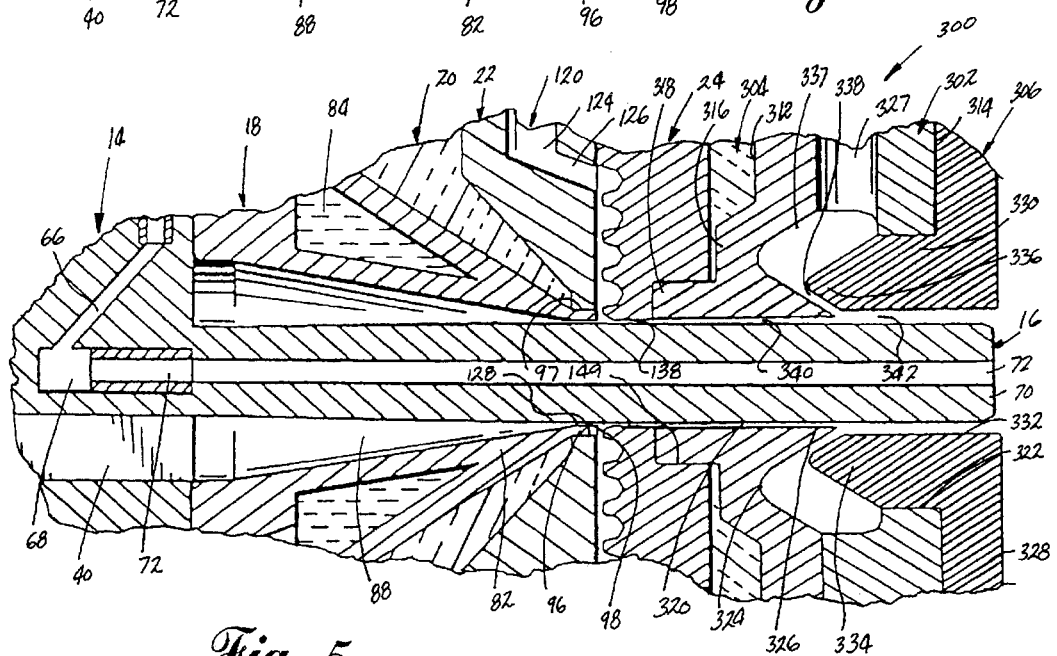
FIG. 5 is an enlarged portion of FIG. 4, showing the flow path of the extruded material in greater detail.
Figure 4:
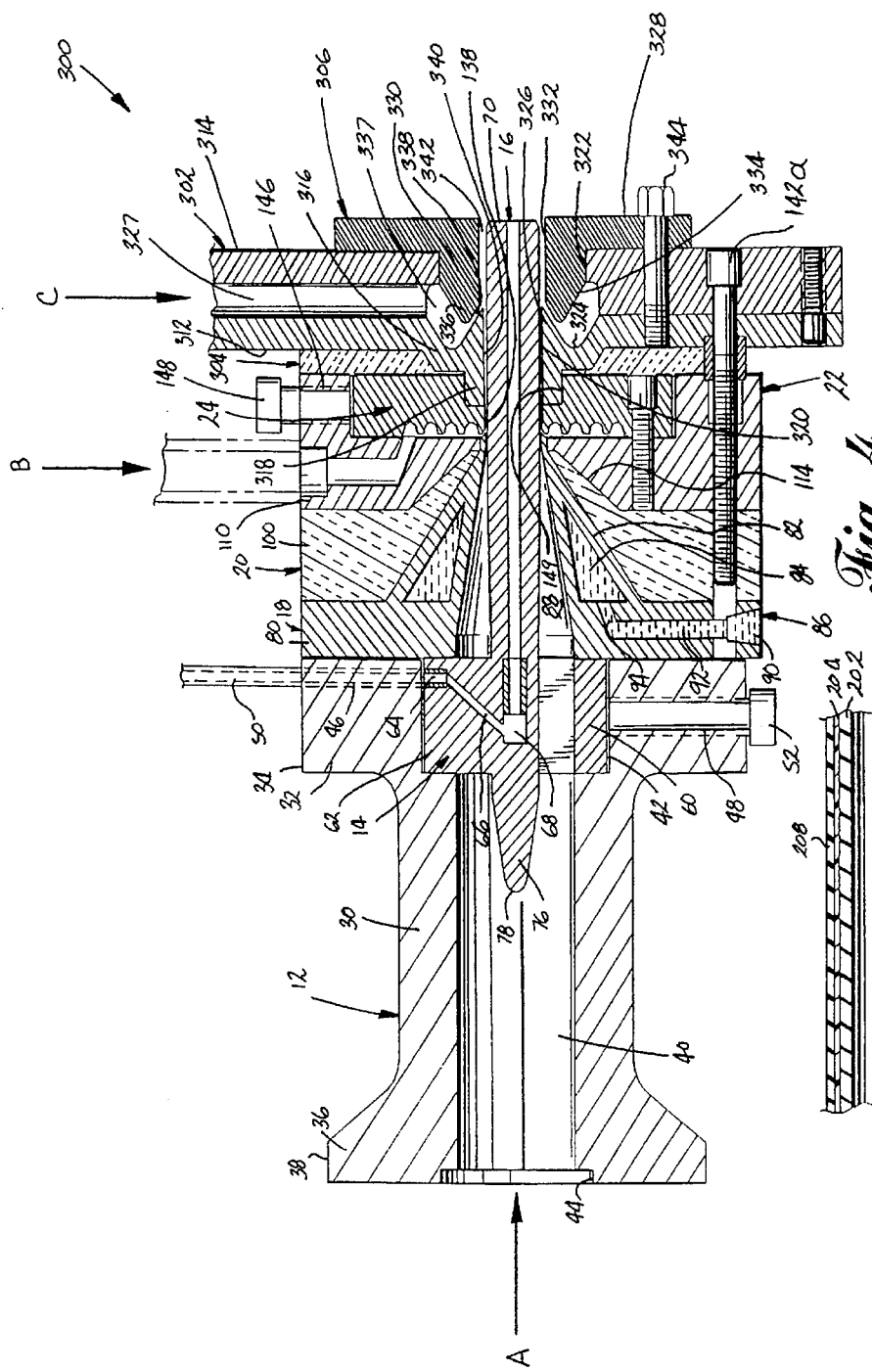
FIG. 4 is a longitudinal cross-sectional view of a tri-layer extrusion apparatus according to the invention.
Figure 6:
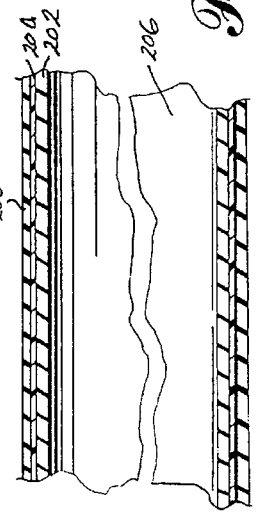
FIG. 6 is a fragmentary perspective view of a tri-layer fuel tube produced by the extrusion apparatus of FIG. 4 according to the invention.

FIGS. 4 and 5 show a second embodiment of the invention wherein an elastomeric compound can be crosshead extruded onto the tube 200. Referring to FIGS. 4 and 5, where like numbers have been used to describe like parts, an additional extrusion die 302 is serially attached to the second die 24 about the distal end 74 of mandrel 16. The third die 302, an insulator ring 304, and an end cap 306 form a third die assembly 300. Third die 302 comprises a disk 310 having interior and exterior surfaces 312 and 314, respectively. Interior surface 312 includes an annular ridge 316 which abuts an axial sleeve 318 which surrounds a bore 320 located through the central portion of disk 310. The exterior surface 314 of disk 310 includes a wide bore 322 which defines an annular groove 324 surrounding the interior edge 326 of axial sleeve 318. Third die 302 also includes a transverse conduit 327 which extends from the exterior surface of third die 302 (not shown) and connects the exterior of the die with the annular cavity 337. Insulator ring 304 is constructed of a similar insulating material as insulator ring 20 discussed in the previous embodiment. End cap 306 is a disk 328 having an interior axial sleeve 330 defining a central bore 332. The distal portion 334 of interior axial sleeve 330 terminates in a sloped ridge 336.

The third extrusion die 302 is fastened to the end cap 306 through several threaded fasteners 344, only one of which is shown in FIG. 4. The third extrusion die 302 is securely fastened to the die 18 through several threaded fasteners 142a, only one of which is shown in FIG. 4

In assembly, the third die assembly 300 is attached to the extrusion head 10 of the previous embodiment via threaded fasteners 142 and 342. Axial sleeve 318 of the third die 302 is installed within a countersunk bore 149 on the exterior surface of second die 24 with the insulator ring 304 installed between the third die 302 and the second die 24 with the longitudinal portion 70 of mandrel 16 extending through bore 320 in the third die 302. The axial bore 332 of end cap 306 extends over the longitudinal portion 70 of mandrel 16 and the ridge 336 on the distal portion of axial sleeve 330 defines a distribution channel 338 with the interior edge 326 of third die 302. An annular channel 340 is formed between the interior surface of axial sleeve 318 of third die 302 and the exterior surface of the longitudinal portion 70 of mandrel 16. The ridge 336 on axial sleeve 330 and the annular groove 324 on third die 302 defines an annular cavity 337. An additional annular channel 342 is defined between the bore 332 of axial sleeve 330 of end cap 306 and the outer portion 70 of mandrel 16. Annular channel 342 is slightly wider than the annular channel 340 which, in turn, is slightly wider than the annular channel 138 adjacent to second die 24.

In operation, an elastomeric layer is extruded onto the surface of the tubing 200 through the operation of the third die assembly 300. The two-layer tubing produced in the first embodiment (FIGS. 1–3) is produced in the same manner in this embodiment. However, an outer layer of an elastomeric material is deposited onto the two-layer tubing 200 as it passes through the annular channel 340. Transverse conduit 327 is aligned at its exterior inlet with a third extruder material which forces a fluid elastomeric compound into the traverse conduit 327 along the direction shown at "C." The elastomeric material is then forced into the annular cavity 337 and through distribution channel 338 for extrusion onto the thermoplastic layer. The elastomeric material is force through distribution channel 338 onto the outer surface of the thermoplastic layer of the tube located in annular channel 342. Third die 302 and end cap 306 can contain interior conduits (not shown) for circulation of a cooling fluid throughout to maintain the third die assembly 300 at a proper temperature for the elastomeric material being extruded.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. An extrusion die for co-extruding at least two layers of polymers at substantially different temperatures comprising:

a first die having an extrusion nozzle defining an opening for extruding a first molten material into a predetermined shape along an axis through the first die opening;

a first housing having a passage for delivering under pressure the first molten material at a first temperature to the first die;

a second die having an opening for extruding a second molten material at a second temperature different than the temperature of the first molten material along an axis through the second die opening onto the predetermined shape extruded from the first die to laminate said second material onto said predetermined shape;

fasteners joining the second die to the first die in axially spaced juxtaposition thereto and with the axes of the first and second die openings substantially aligned.

a second housing mounted to the second die and having a passage axially spaced from said first housing passage for delivering under pressure a second molten material to the second die opening;

a layer of insulation between the first die and the second die to minimize heat transfer therebetween; and an internal chamber having external ports in said first die adjacent said layer of insulation for circulating cooling fluid to remove heat from said first die to maintain said first die at said first temperature.

2. An extrusion die according to claim 1 wherein the first die extrusion nozzle has a relatively short annular land at a downstream end portion thereof; and the second housing is positioned at least in part between the first die and the second die and has an edge in supporting contact with the annular land.

3. An extrusion die according to claim 2 wherein the second housing edge is annular and supports the annular land about substantially the entire annular land.

4. An extrusion die according to claim 2 wherein the first die has a conical exterior surface upstream of the annular land and the layer of insulation extends along the conical external surface.

5. An extrusion die according to claim 4 wherein the insulation has thermal transfer properties of glass fiber batting.

6. An extrusion die according to claim 4 wherein the first die extrusion nozzle has a leading edge which forms a second extrusion nozzle with a portion of the second die.

7. An extrusion die according to claim 6 wherein the second die has a conduit in communication between the passage in the second housing and the second extrusion nozzle.

8. An extrusion die according to claim 7 wherein the second die conduit extends substantially orthogonally from the axes of the first and second die openings.

9. An extrusion die according to claim 8 wherein the second die conduit spirals about the axes of the first and second die openings.

10. A method for co-extruding at least two layers of polymers at substantially different temperatures in a first die having an extrusion nozzle defining an opening for extruding a first thermosetting polymer into a predetermined shape along an axis through the first die opening and a second die having an opening with an axis for extruding a thermoplastic polymer onto the predetermined shape to form a laminate therewith, the second die being joined to the first die in juxtaposition thereto and with the axes of the first and second die openings substantially aligned comprising the steps of:

extruding a first thermosetting polymer through a first die opening at a first temperature to form a predetermined shape;

extruding a thermoplastic polymer through the second die opening at a second temperature substantially higher than the first temperature and onto the predetermined shape to form a laminate of the first thermosetting polymer and the thermoplastic polymer;

insulating the first die from the second die and cooling the first die to maintain the temperature of the first thermosetting polymer and the thermoplastic polymer at the first and second predetermined temperatures, respectively, at least until the first thermosetting polymer and the thermoplastic polymer are extruded from the first and second die openings, respectively.

11. An extrusion die according to claim 1 wherein the second die has a conduit in communication between the passage in the second housing and the second die opening.

12. An extrusion die according to claim 1 and further comprising a third die mounted to the second die and having an opening with an axis aligned with the axes of the first and second die openings and adapted to deposit a molten layer of a third material onto the layer of the second material to form a laminate therewith.

13. An extrusion die according to claim 12 wherein the third die has an inner annular portion forming an opening for said laminate of said first and second materials to pass therethrough, said inner annular portion having an upstream portion in contact with a downstream end of said second die, and an outer annular portion of the third die having an upstream surface which is axially spaced from the downstream end of the second die; and a layer of insulation between the upstream surface of the outer annular portion of the third die and the downstream end of the second die.

14. An extrusion die according to claim 1 wherein the first die has a conical exterior surface upstream of the nozzle and the layer of insulation extends along the conical external surface.

15. An extrusion die according to claim 14 wherein the first die extrusion nozzle has a leading edge which forms a second extrusion nozzle with a portion of the second die.

16. An extrusion die according to claim 15 wherein:

the second die has a conduit in communication between the passage in the second housing and the second extrusion nozzle;

the second die conduit extends substantially orthogonally from the axes of the first and second die openings; and the second die conduit spirals about the axes of the first and second die openings.

17. An extrusion die according to claim 1 wherein the insulation has thermal transfer properties of glass fiber batting.

18. An extrusion die according to claim 1 and further comprising a mandrel which extends through the openings in the first and second dies, whereby the first and second dies are adapted to extrude multilayer tubing and the axes of the first and second die openings are coaxial.

19. An extrusion die according to claim 18 and further comprising a third die mounted to the second die and adapted to deposit a molten layer of a third material onto the layer of said second material to form a laminate therewith, said mandrel extending through said third die.

20. A method according to claim 10 wherein the thermosetting polymer is an FKM fluoropolymer and the thermoplastic polymer is a THV fluoropolymer.

21. A method according to claim 10 wherein the first temperature is below 220° F.

22. A method according to claim 21 wherein the second temperature is in excess of 450° F.

23. A method according to claim 10 wherein a second thermosetting material is extruded through a third die opening in a third die adjacent to the second die onto the thermoplastic polymer layer at a temperature substantially less than the second predetermined temperature while insulating the third die from the second die.

24. A method according to claim 23 wherein the third die has at least a portion thereof connected to the second die and other portions spaced from the second die.

25. A method according to claim 23 wherein the temperature of the second thermosetting material is less than 250° F.

26. A method according to claim 10 wherein the predetermined shape is a tube and the axes of the first and second die openings are coaxial.

* * * * *